(12) United States Patent
Thorson et al.

(10) Patent No.: US 8,463,270 B2
(45) Date of Patent: Jun. 11, 2013

(54) METHOD AND APPARATUS FOR PROVIDING ADJUSTED HANDOFF PARAMETERS BASED ON RECEIVER CLASSIFICATION

(75) Inventors: Dean E. Thorson, Grayslake, IL (US); William P. Alberth, Jr., Prairie Grove, IL (US); Scott T. Droste, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 963 days.

(21) Appl. No.: 11/418,700

(22) Filed: May 5, 2006

(65) Prior Publication Data

US 2007/0275722 A1 Nov. 29, 2007

(51) Int. Cl.
*H04W 4/00* (2009.01)
(52) U.S. Cl.
USPC .......................................... 455/436; 370/338
(58) Field of Classification Search
USPC .......................................... 455/436, 437–444
See application file for complete search history.

(56) References Cited

U.S. PATENT DOCUMENTS

| | | | | |
|---|---|---|---|---|
| 5,898,682 | A * | 4/1999 | Kanai | 370/331 |
| 2001/0030953 | A1* | 10/2001 | Chang | 370/331 |
| 2004/0128191 | A1* | 7/2004 | Kotzin | 705/14 |
| 2006/0023650 | A1* | 2/2006 | Dominique et al. | 370/310 |
| 2006/0116137 | A1* | 6/2006 | Jung | 455/458 |
| 2007/0025480 | A1* | 2/2007 | Tackin et al. | 375/345 |
| 2008/0287133 | A1* | 11/2008 | Park et al. | 455/442 |
| 2009/0196232 | A1* | 8/2009 | Maltsev et al. | 370/328 |

FOREIGN PATENT DOCUMENTS

EP 1453263 A1 * 9/2004

OTHER PUBLICATIONS

"Upper Layer (Layer 3) Signaling Standard for cdma2000 Spread Spectrum Systems," 3rd. Gen. Partnership Proj. 2 (3GPP2); 3GPP2 C.S0005-C, Ver. 2.0, pp. 1-1 through 1-50; Section 2.3.3, p. 2-7 (Jul. 23, 2004).

* cited by examiner

*Primary Examiner* — Marcos Batista

(57) ABSTRACT

A mobile station (201) having an improved receiver capability over legacy mobile stations may detect additional base stations (205, 209) for the candidate list (219). The mobile station (201) provides a receiver capability indication to the network via a message such as an origination message, a page response message, a handover message, or a registration message. The message may utilize one or more bit fields of an information packet (300), or otherwise an information element (401) to convey the receiver capability information. The BTS (203) or BSC (109) will accordingly customize the mobile station handover parameters to better utilize the mobile station capabilities.

26 Claims, 5 Drawing Sheets

METHOD AND APPARATUS FOR PROVIDING ADJUSTED HANDOFF PARAMETERS BASED ON RECEIVER CLASSIFICATION

FIELD OF THE DISCLOSURE

The present disclosure relates generally to wireless communications systems, and more particularly to mobile station handovers within such wireless communications systems and even more particularly to providing handover parameters to a mobile station prior to handover operations.

BACKGROUND

As digital signal processor (DSP) speed and power increases over time, wireless communications system digital signal processing may utilize higher complexity approaches that were not feasible previously due to processing constraints.

For example, mobile stations may employ various new approaches to interference cancellation which effectively improves mobile station receiver sensitivity over legacy mobile stations.

In systems such as IS-2000 CDMA, a mobile station having improved receiver sensitivity will be capable of detecting and receiving pilot signals from a much larger subset of its neighbor list than would a legacy mobile. Such improved mobile stations would therefore consume additional Walsh code resources because channels from various neighboring base stations would be assigned to the mobile station for CDMA soft handover implementation.

Therefore, valuable network channel resources would be unnecessarily tied up, and the full capabilities of the improved mobile station receivers would not be effectively utilized.

DETAILED DESCRIPTION

To address the above-mentioned need, a method and apparatus for providing adjusted handoff parameters is provided herein.

Figure 1:
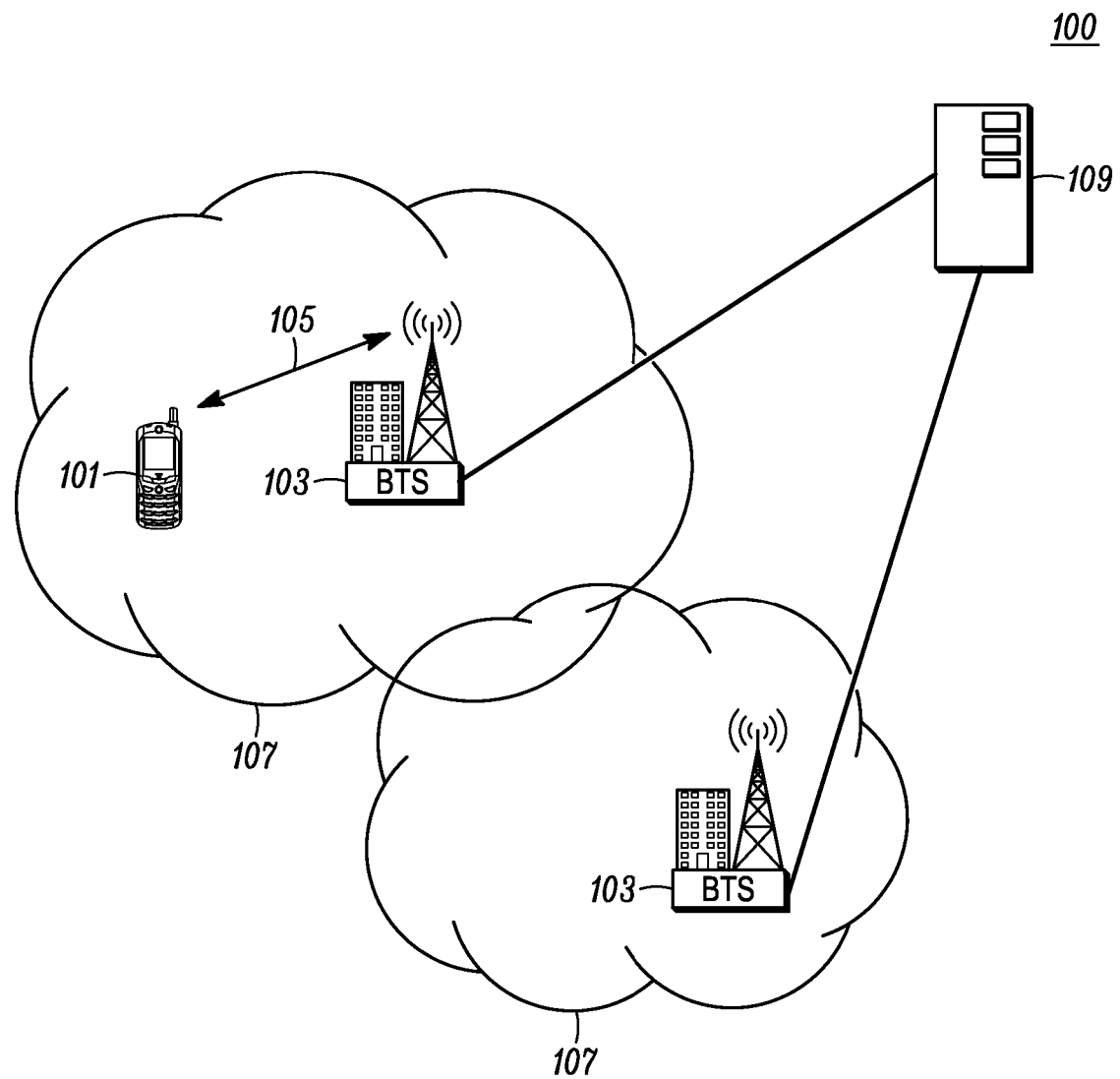
FIG. 1 is a block diagram of a wireless network having various base transceiver stations and a base station controller.

Turning now to the drawings wherein like numerals designate like components, FIG. 1 illustrates a wireless network having various base transceiver stations (BTS) 103. Each BTS 103 transmits and receives radio signals from a mobile station, such as mobile station 101, over an air interface 105. Air interface 105 may be any of a variety of air interfaces such as, but not limited to, IS-95 CDMA, IS-2000 CDMA, UMTS, etc.

Each BTS 103 has a radio coverage area 107, that is, an area over which its radio transmissions may be received as a strongest signal such that the BTS is the "best server" for any particular mobile station within the coverage area 107. In general, radio coverage areas may overlap forming an overall network coverage area. It is to be noted that the mobile station 101 may perceive, via its radio receiver, several BTS signals of various signal strengths based upon various conditions such as distance, Rayleigh fading, receiver sensitivity, etc.

Each BTS 103 is connected to a base station controller (BSC) 109 via backhaul connections. Several BTSs may be controlled by a single BSC 109. Also, the network may comprise many BSCs. As the mobile station travels through the various radio coverage areas 107, it will handover from BTS to BTS based on criteria referred to as handover parameters. For example, in a CDMA-2000 system various parameters, or thresholds "T," are used to determine when a mobile station should handover from one BTS 103 coverage area 107 to another. Examples of such threshold parameters in a CDMA system are referred to "$T_{ADD}$" and "$T_{DROP}$."

Further in a CDMA system in general, soft handover is employed, that is, a make-before-break handover wherein a mobile station such as mobile station 101 may be connected to several BTS channels at any given time. The handover parameters such as $T_{ADD}$ and $T_{DROP}$ may be used by the mobile station 101 to determine when to add and drop a soft handover connection, respectively, to a given BTS. The handover thresholds are constrained by various conditions and considerations one of which may be the receiver sensitivity of the mobile station receiver. Depending on the signal level that may be received and accurately decoded by the mobile station, a number of surrounding BTS signals may be detectable.

Figure 2:
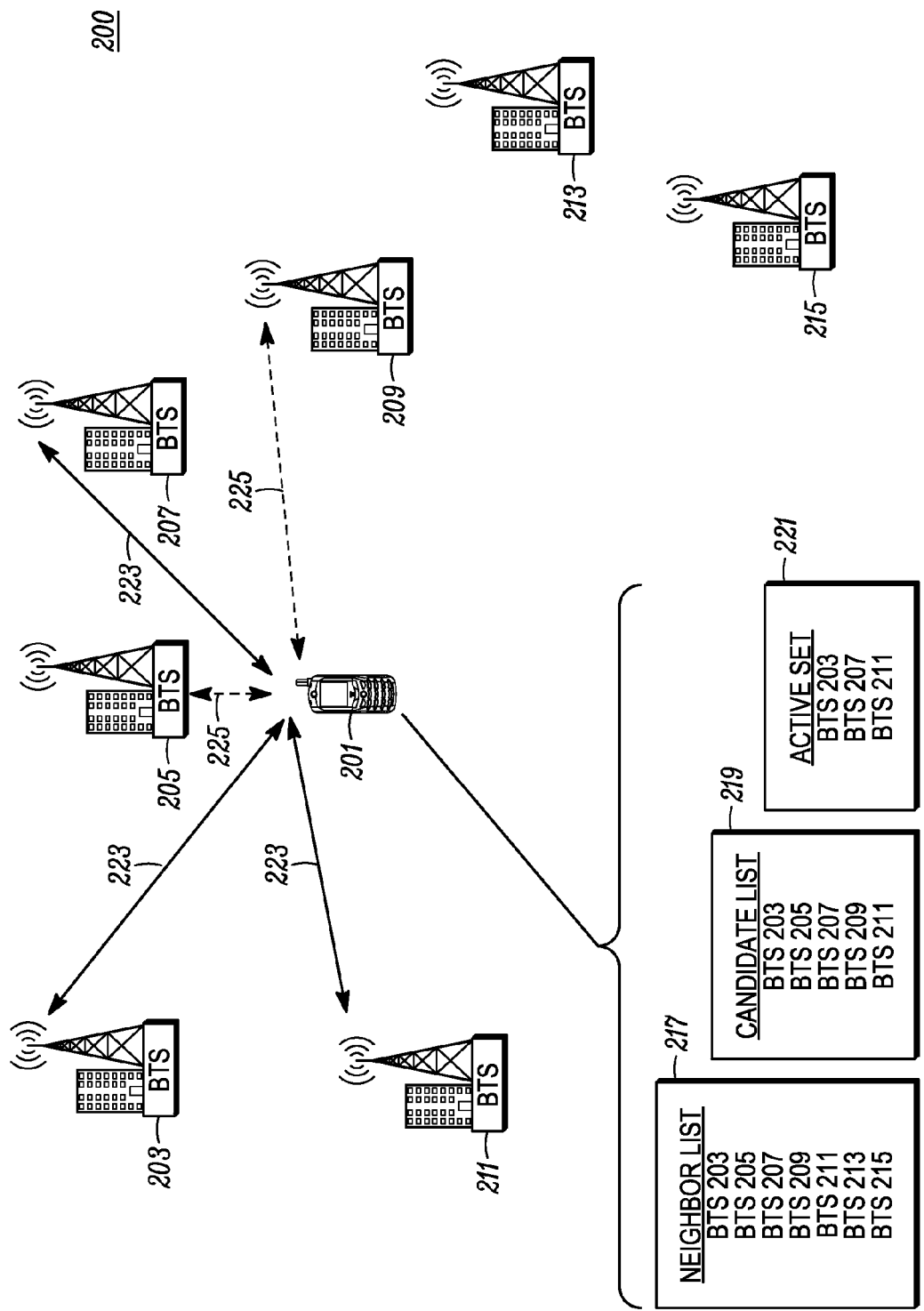
FIG. 2 is a block diagram of a CDMA wireless network wherein a mobile station has a neighbor list, a candidate list, and an active set.

Turning now to FIG. 2, a mobile station 201 will contain a neighbor list 217 which provides BTS identifiers for such surrounding BTS sites that are likely candidates for handover. The mobile station 201, based on its ability to receive and decode neighbor list BTS signals will promote a BTS, when the BTS received signal meets a criteria set, to a candidate list 219, and may send a message to the BTS notifying the network of such new candidates. Thus, mobile station 201 may be able to detect only a subset of the BTS sites listed in its neighbor list 217. For example, in FIG. 2 mobile station 201 can detect BTS 203, BTS 205, BTS 207, BTS 209 and BTS 211. BTS 213 and BTS 215 cannot be detected even though they are designated in neighbor list 217. The detected BTS sites are thus promoted to the candidate list 219.

Depending on traffic resource availability, the network may respond, via BSC 109 for example and a corresponding BTS in communication with the mobile station, by assigning a traffic channel from a BTS on the mobile station 101 BTS candidate list. Thus in FIG. 2, the mobile station 201 has traffic channels assigned for BTS 203, BTS 207 and BTS 211 and establishes soft-handover connections 223 to each BTS. BTS 203, BTS 207 and BTS 211 are therefore part of the mobile station 201 active set 221. Note that, while BTS 205 and BTS 209 are still detectable via air interface 225, they are not assigned to the mobile station 201 active set 221.

However, as the mobile station 201 travels through the network, radio conditions will change and the criteria required for establishing active set connections will likewise change. Therefore, the active set 221, as well as the neighbor list 217 and candidate list 219, are dynamic lists that are modified by the mobile station 201 location and various radio conditions occurring at each location.

Further in FIG. 2, mobile station 201 is unable to detect BTS 213 and BTS 215. However, if mobile station 201 had a better receiver characteristic, such as an improved receiver sensitivity, it is possible that BTS 213 and BTS 215 might also be detectable and therefore would be part of the candidate list 219.

New model mobile stations having improved receiver capability would have advantages over older legacy models with respect to the number of detected BTS sites. However, if the criteria for handovers, or for that matter soft-handover connections, are globally set for a network, such new model mobile stations would be assigned to relatively more soft handoff links then mobile stations without an improved receiver sensitivity resulting in decreased system capacity.

Therefore in the various embodiments, a mobile station will provide a capability indication to the network such that criteria may be customized for the particular mobile station. Such capability indications may indicate for example, interference cancellation capability, pilot cancellation capability, receiver sensitivity, or various combinations thereof.

Figure 3:
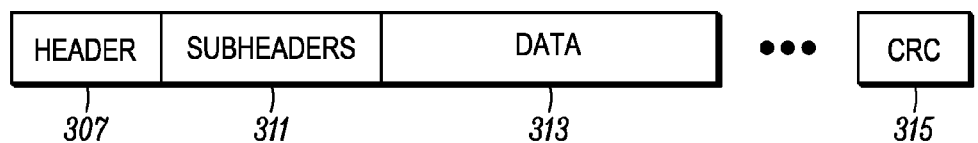
FIG. 3 is a block diagram of a data packet.

FIG. 3 illustrates a packet of information that may in some embodiments, be used for communication of messages between a BTS and a mobile station. In general, such packets will comprise a header 307, sub-headers 311, a data portion 313 and optionally a Cyclic Redundancy Check field 315. In the embodiments employing packetized communications a message may be sent by a mobile station to the network, wherein a portion of the sub-header 311 bits, or a portion of the data 313 bits may contain a receiver class information of the mobile station. The receiver class information may be contained in messages such as, but not limited to, an origination message, a page response message, a handover message, or a registration message.

Figure 4:
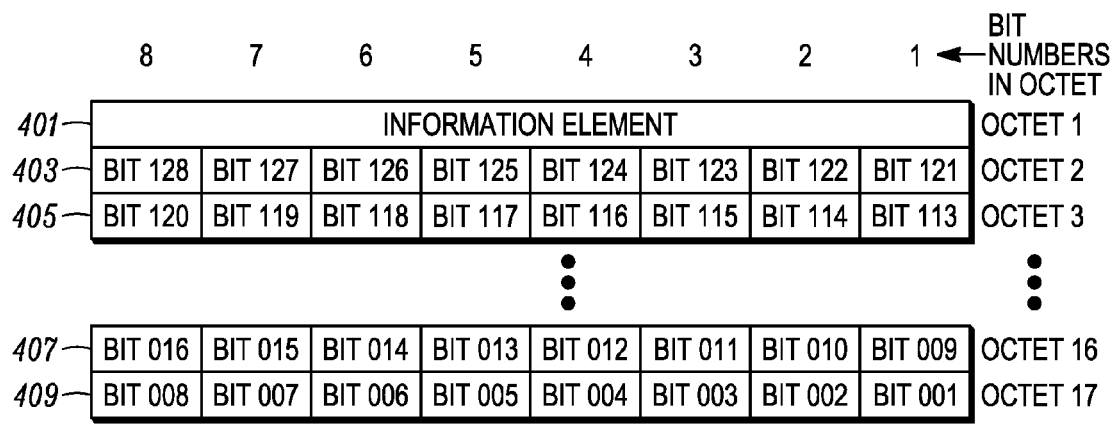
FIG. 4 is a bit map diagram of an information element contained in various messages sent by a mobile station to a base station.

In an alternative embodiment, the receiver class information may be contained within unused bit fields of an information element. Various information elements are exchanged between mobile stations and a network during mobile station idle mode, or during call-setup, registrations etc. Therefore, the information element (IE) represented by FIG. 4 is a generic representation of an IE that may be contained in messages such as, but not limited to, an origination message, a page response message, a handover message, or a registration message.

An IE may be of any appropriate length and may therefore be several octets in length. In some embodiments, only a single bit may be used to indicate either binary "0" for legacy mobile stations and binary "1" for new model mobile stations having some enhanced receiver capability. However, a number of bit fields may be used in the various embodiments to contain the receiver class information. For example, a contiguous set of bit fields may be used such as bit 121, bit 122, bit 123 and bit 124, all of which are contained in the second octet 403. Alternatively, the bit fields may be scattered throughout the IE, or in various configurations, for example bit 002 of the $17^{th}$ octet 409, bit 011 of the $16^{th}$ octet 407, and bits 118 and 120 of the $3^{rd}$ octet 405 may be used.

By using four bit fields the binary values "0000" though "1111" may be used to provide sixteen different receiver classes. For example "0000" may be used for a legacy mobile station. Each binary value incremented by one, may correspond to improvements in receiver sensitivity of 3 dB in some embodiments. Therefore, a receiver class "0001" may have a 3 dB better receiver sensitivity than legacy mobile station "0000" in accordance with some embodiments. Also, in some embodiments one or two bits may be used to indicate interference cancellation capability and/or pilot cancellation capability.

Figure 5:
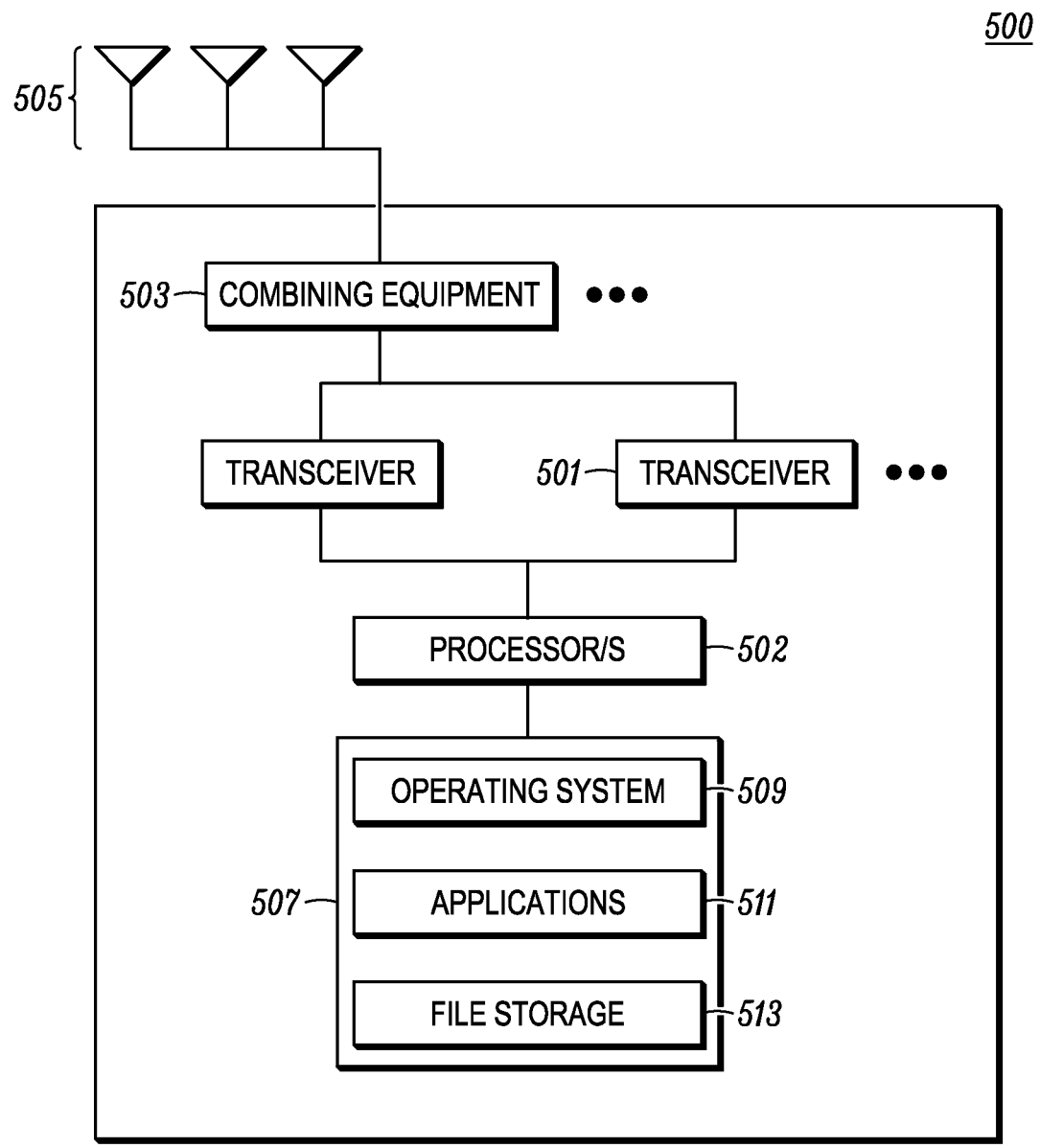
FIG. 5 is a block diagram illustrating the high level components of a base transceiver station in accordance with the various embodiments.

FIG. 5 is a block diagram illustrating the primary components of a base transceiver station (BTS) in accordance with some embodiments. BTS 500 comprises one or more transceivers 501, at least one processor 502, and at least one memory 507. Memory 507 has storage sufficient for the BTS operating system 509, applications 511 and general file storage 513. Transceivers 501 may be for communicating using various standards such as, but not limited to, UMTS, E-UMTS, IS-95 CDMA, IS-2000 CDMA, etc. The transceivers 501 may be further connected to radio combining equipment 503 and further coupled to antennas 505.

It is to be understood that FIG. 5 is for illustrative purposes only and is for illustrating the main components of a BTS in accordance with the present disclosure, and is not intended to be a complete schematic diagram of the various components and connections there-between required for a BTS. Therefore, a BTS may comprise various other components not shown in FIG. 5 and still be within the scope of the present disclosure.

Memory 507 is for illustrative purposes only and may be configured in a variety of ways and still remain within the scope of the various embodiments herein disclosed. For example, memory 507 may be comprised of several elements each coupled to the processor 502. Further, separate processors and memory elements may be dedicated to specific tasks. In any case, the memory 507 will have at least the functions of providing storage for an operating system 307, applications 309 and general file storage 513. In some embodiments, applications 511 may comprise a software stack that communicates with a like stack in a mobile station, such that messages may be transmitted there-between, and such messages may contain bit fields corresponding to a mobile station receiver class as disclosed herein.

Figure 6:
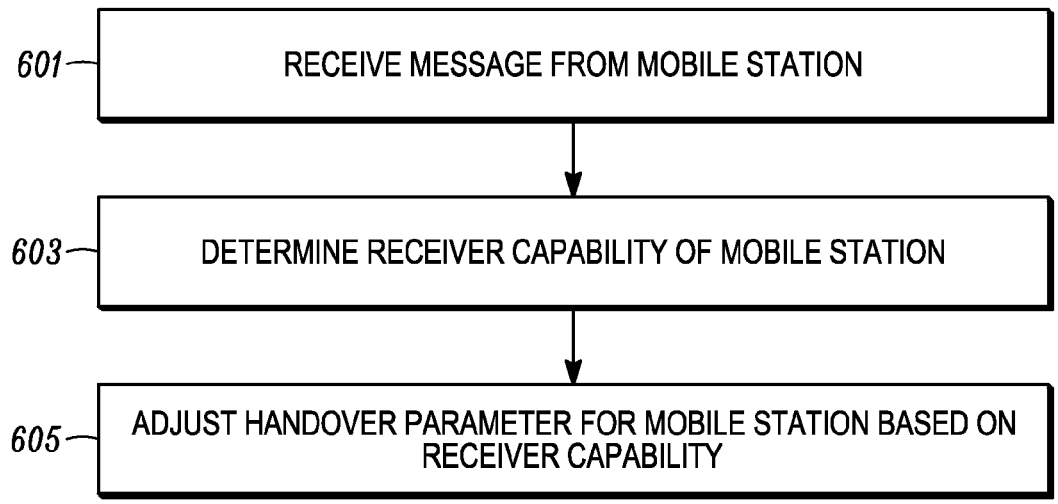
FIG. 6 is a flow chart illustrating the high level operation of the various embodiments.

FIG. 6 illustrates high level operation of the BTS 500 in the various embodiments. In 601, the BTS receives a message from the mobile station such as, but not limited to, an origination message, a page response message, a handover message, or a registration message. The message will contain bit fields that designate a receiver class of the mobile station such that the mobile station capability may be determined as shown in 603. In 605, the BTS (or alternatively the BSC) may adjust or otherwise customize handover parameters for the particular mobile station based upon its previously designated receiver class information. The BTS may then communicate the new handover parameter information to the mobile station in a subsequent message, which may be any type of message having bits available in a packet or IE such as was discussed with respect to packet 300 of FIG. 3 and the IE illustrated in FIG. 4.

Figure 7:
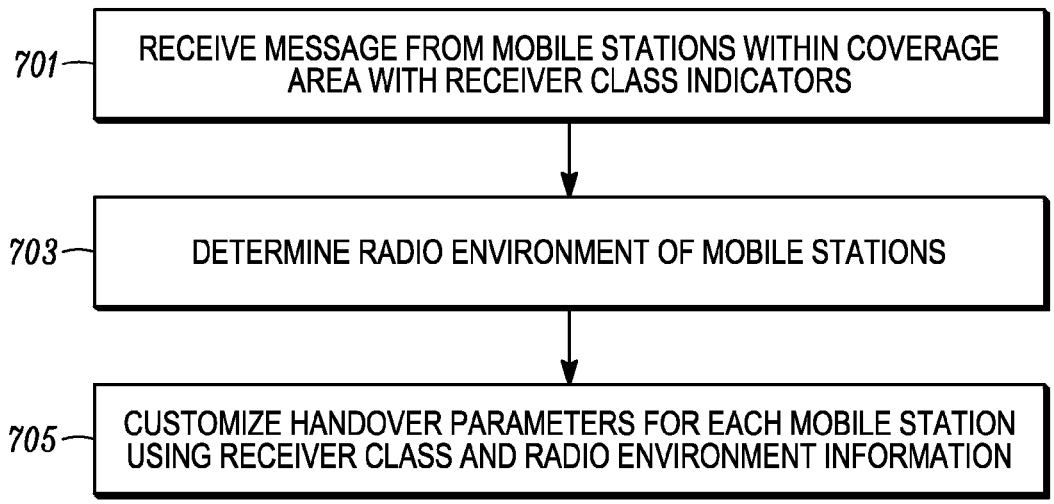
FIG. 7 is a flow chart illustrating additional detail of the high level operation of the various embodiments.

FIG. 7 shows additional operational details, thus in 701 the BTS receives a message from a mobile station such as, but not limited to, an origination message, a page response message, a handover message, or a registration message. The message contains four bits which designate one of sixteen possible receiver classes for the mobile station. In 703, the BTS determines the radio environment of the mobile station. It is to be understood that 703 may include receiving additional information from the mobile station such as, but not limited to, a signal-to-noise ration (SINR) measurement, or a like indication such as bit-energy-to-noise ($E_b/N_o$) ratio, a frame erasure rate (FER), bit error rate (BER), or any other information appropriate for determining the radio environment of the mobile station at a particular time.

The BTS will subsequently, as shown in 705, customize the handover parameters such as, but not limited to, $T_{ADD}$, $T_{DROP}$, etc., and may further convey the new parameters to the mobile station as mentioned above. For example, a mobile station having a better receiver sensitivity than a legacy mobile may have a much more degraded $T_{DROP}$ value because the mobile station may be able to decode much weaker signals than would a legacy mobile. Therefore, a network employing the method and apparatus of the present disclosure would have additional flexibility in allocating traffic resources and/or redistributing traffic via for example handovers at appropriate times and may therefore improve overall network performance.

In an alternative embodiment, the mobile station may modify the handover parameters. For example, a mobile station with an improved receiver using interference cancellation may have, for example, 3 dB improved performance relative to legacy mobile stations. The mobile station may therefore receive parameters over the air from the base station and modify the parameters before using them to determine which base stations to report to the network as handover candidates.

Further in some embodiments, the mobile station will also send modified signal strength measurements to the network. For example, if the received signal strength is X, and the mobile station has 3 dB improved sensitivity, the mobile station may report a signal strength between X and X-3 dB inclusive. This would result in the mobile station reporting power equivalent to legacy mobiles which would result in similar system loading.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of adjusting handover parameters of a mobile station, the method comprising:
   receiving a message from a mobile station, said message having a value corresponding to a receiver capability of said mobile station, wherein said receiver capability includes receiver sensitivity;
   adjusting at least one handover parameter for said mobile station based on said value corresponding to the receiver capability of said mobile station;
   transmitting the at least one handover parameter as adjusted to said mobile station;
   in response to transmitting the at least one handover parameter, receiving a pilot signal strength measurement message based on the at least one handover parameter as adjusted from said mobile station; and
   performing a handover operation in response to receiving the pilot signal strength measurement message.

2. The method of claim 1, wherein said adjusting at least one handover parameter for said mobile station using said value, further comprises:
   determining radio frequency environment parameters for said mobile station; and
   adjusting said at least one handover parameter using said radio frequency environment parameters with said value.

3. The method of claim 2, further comprising:
   determining traffic environment parameters for said mobile station; and
   adjusting said at least one handover parameter using said radio frequency environment parameters and said traffic environment parameters with said value.

4. The method of claim 1, wherein said receiving a message from a mobile station, said message having a value corresponding to a receiver capability of said mobile station, further comprises:
   receiving one of an origination message, a page response message, a handover message, or a registration message.

5. The method of claim 1, wherein said adjusting said at least one handover parameter for said mobile station using said value, further comprises:
   adjusting one of a parameter for determining when said mobile station will attach to a base station channel, or a parameter for determining when said mobile station will detach from a base station channel.

6. The method of claim 1, wherein said receiver capability includes at least one of interference cancellation capability or pilot cancellation capability.

7. A method of adjusting handover parameters of a mobile station, the method comprising:
   receiving a first message from a first mobile station having a first receiver class, said message having an indicator for said first receiver class;
   receiving a second message from a second mobile station having a second receiver class, said second message having an indicator for said second receiver class;
   adjusting a first handover parameter for said first mobile station based on said first receiver class and adjusting a second handover parameter for said second mobile station based on said second receiver class;
   transmitting the first and second handover parameters as adjusted to said first and second mobile stations, respectively;
   in response to transmitting at least one of the first and second handover parameters, receiving a pilot signal strength measurement message based on one of the first or second handover parameters as adjusted; and
   performing a handover operation in response to receiving the pilot signal strength measurement message
   wherein said first and second receiver classes correspond to receiver capabilities of said first and second mobile stations, respectively, wherein each of said receiver capabilities includes receiver sensitivity.

8. The method of claim 7, wherein said adjusting a first handover parameter for said first mobile station using said first receiver class and adjusting a second handover parameter for said second mobile station using said second receiver class, further comprises:
   determining a first radio frequency environment parameters for said first mobile station;
   determining a second radio frequency environment parameters for said second mobile station;
   adjusting said first handover parameter using said first radio frequency environment parameters with said first receiver class; and
   adjusting said second handover parameter using said second radio frequency environment parameters with said second receiver class.

9. The method of claim 8, further comprising:
   determining a first traffic environment parameters for said first mobile station, and a second traffic environment parameters for said second mobile station;
   adjusting said first handover parameter using said first radio frequency environment parameters and said first traffic environment parameters with said first receiver class; and adjusting said second handover parameter using said second radio frequency environment parameters and said second traffic environment parameters with said second receiver class.

10. The method of claim 7, wherein said receiving a first message, and said receiving a second message, further comprises:
receiving one of an origination message, a page response message, a handover message, or a registration message.

11. The method of claim 7, wherein said adjusting a first handover parameter for said first mobile station using said first receiver class and adjusting a second handover parameter for said second mobile station using said second receiver class, further comprises:
adjusting one of a parameter for determining when said mobile station will attach to a base station channel, or a parameter for determining when said mobile station will detach from a base station channel.

12. The method of claim 7, wherein said indicator for said first receiver class, and said indicator for said second receiver class, each comprise four binary bits.

13. The method of claim 12, wherein said four binary bits indicate one of sixteen receiver class indications.

14. The method of claim 13, wherein said sixteen receive class indications correspond to receiver sensitivities in 3 dB increments.

15. A wireless base station comprising:
a transceiver configured to receive a message and a pilot signal strength measurement message from a mobile station, said message having a value corresponding to a receiver capability of said mobile station and said pilot signal strength measurement message being based on at least one adjusted handover parameter, wherein said receiver capability includes receiver sensitivity; and
a processor coupled to said transceiver, said processor configured to adjust at least one handover parameter for said mobile station based on said value corresponding to the receiver capability of said mobile station to generate the at least one adjusted handover parameter, wherein the transceiver transmits the at least one adjusted handover parameter to said mobile station and receives, in response to transmitting the at least one adjusted handover parameter, said pilot signal strength measurement message.

16. The wireless base station of claim 15, wherein said processor is further configured to:
determine radio frequency environment parameters for said mobile station; and
adjust said at least one handover parameter using said radio frequency environment parameters with said value.

17. The wireless base station of claim 16, wherein said processor is further configured to:
determine traffic environment parameters for said mobile station; and
adjust said at least one handover parameter using said radio frequency environment parameters and said traffic environment parameters with said value.

18. The wireless base station of claim 15, wherein said transceiver is further configured to receive one of an origination message, a page response message, a handover message, or a registration message, and said processor is further configured to determine a value therefrom corresponding to a receiver capability of said mobile station.

19. The wireless base station of claim 15, wherein said processor is further configured to adjust said at least one handover parameter for said mobile station using said value by adjusting one of a parameter for determining when said mobile station will attach to a base station channel, or a parameter for determining when said mobile station will detach from a base station channel.

20. A wireless base station comprising:
at least one transceiver configured to receive a first message from a first mobile station having a first receiver class, said message having an indicator for said first receiver class and receive a second message from a second mobile station having a second receiver class, said second message having an indicator for said second receiver class, wherein the at least one transceiver is further configured to receive at least one pilot signal strength measurement message based on a corresponding adjusted handover parameter from at least one of said first or second mobile stations; and
a processor coupled to said at least one transceiver, said processor configured to adjust a first handover parameter for said first mobile station based on said first receiver class to generate a first adjusted handover parameter and adjust a second handover parameter for said second mobile station based on said second receiver class to generate a second adjusted handover parameter, wherein the at least one transceiver transmits the first and second adjusted handover parameters to said first and second mobile stations and receives, in response to transmitting at least one of the first and second adjusted handover parameters, said pilot signal strength measurement message,
wherein said first and second receiver classes correspond to receiver capabilities of said first and second mobile stations, respectively, wherein each of said receiver capabilities includes receiver sensitivity.

21. The wireless base station of claim 20, wherein said processor is further configured to adjust a first handover parameter for said first mobile station using said first receiver class and adjust a second handover parameter for said second mobile station using said second receiver class, by:
determining a first radio frequency environment parameters for said first mobile station;
determining a second radio frequency environment parameters for said second mobile station;
adjusting said first handover parameter using said first radio frequency environment parameters with said first receiver class; and
adjusting said second handover parameter using said second radio frequency environment parameters with said second receiver class.

22. The wireless base station of claim 21, wherein said processor is further configured to:
determine a first traffic environment parameters for said first mobile station, and a second traffic environment parameters for said second mobile station;
adjust said first handover parameter using said first radio frequency environment parameters and said first traffic environment parameters with said first receiver class; and
adjust said second handover parameter using said second radio frequency environment parameters and said second traffic environment parameters with said second receiver class.

23. The wireless base station of claim 20, wherein said processor is further configured to receive a first message, and receive a second message, wherein the first message or the second message is one of an origination message, a page response message, a handover message, or a registration message.

24. The wireless base station of claim 20, wherein said processor is further configured to adjust a first handover parameter for said first mobile station using said first receiver class and adjust a second handover parameter for said second mobile station using said second receiver class, by adjusting one of a parameter for determining when said mobile station will attach to a base station channel, or a parameter for determining when said mobile station will detach from a base station channel.

25. The wireless base station of claim 20, wherein said processor is further configured to determine said indicator for said first receiver class, and said indicator for said second receiver class, by processing two data fields each having four binary bits.

26. The wireless base station of claim 20, wherein said processor is further configured to determine one of sixteen receiver class indications corresponding to receiver sensitivities in 3 dB increments.

\* \* \* \* \*